Oct. 1, 1935. W. A. WEIGHTMAN 2,015,914
CAM ESCAPEMENT WELDING MACHINE
Filed April 11, 1934 6 Sheets-Sheet 1

FIG.1

INVENTOR
WILLIAM A WEIGHTMAN
BY John P. Tarbox
ATTORNEY

Oct. 1, 1935. W. A. WEIGHTMAN 2,015,914
CAM ESCAPEMENT WELDING MACHINE
Filed April 11, 1934   6 Sheets-Sheet 4

INVENTOR.
WILLIAM A. WEIGHTMAN
BY John P. Taylor
ATTORNEY.

FIG.5

Oct. 1, 1935.  W. A. WEIGHTMAN  2,015,914

CAM ESCAPEMENT WELDING MACHINE

Filed April 11, 1934   6 Sheets-Sheet 6

INVENTOR.
WILLIAM A. WEIGHTMAN.
BY John P. Tarbox
ATTORNEY.

Patented Oct. 1, 1935

2,015,914

UNITED STATES PATENT OFFICE 2,015,914

CAM ESCAPEMENT WELDING MACHINE

William A. Weightman, Detroit, Mich., assignor to Budd Wheel Company, Philadelphia, Pa., a corporation of Pennsylvania Application April 11, 1934, Serial No. 720,002

15 Claims. (Cl. 219—4)

My invention relates to metal working machines and has for one of its principal objects the attainment of a relatively small accurately controlled relative die or tool movement during the working operation per se and a relatively large movement during the loading and unloading periods of the machine.

My invention is more particularly applicable to welding machines utilized in the flash welding of members having complemental juxtaposed portions such as spider members, particularly in the making of artillery wheels, although it is not limited to such use as will be readily obvious from the reading of the sub-joined description and claims when taken in connection with the drawings.

In the flash welding of wheel spiders and in other metal working operations, it is important that the relative motion of the dies or tools and work during the welding or working operations be accurately controlled with extremely great accuracy, in view of the critical characteristics of the welding operations, the critical characteristics of the arc during flashing, and the effects upon the resultant weld making such very accurate and careful control essential. During the loading and un-loading operations of the machine a very large relative movement of the dies is needed. This die movement may of necessity be from about one to about three feet or more or less, whereas the movement during the controlled flash welding operation per se may be as little as one-quarter of an inch or on other occasions, depending upon the articles welded, smaller or larger. It is quite apparent that a cam to provide such motions will be enormous in size. Such a cam would be extremely expensive. Furthermore, with so large a cam, expensive machining operations are inherent and an injury to the cam surface would entail a very great loss in time, labor, and/or other items, as well as losses due to the lack of operation of the machine.

Safety features must be incorporated in the machine to avoid injury to the workman and to the machine parts. The machines must not be allowed to start while the operators have their hands in dangerous positions; the machine must be controlled; the cam operation of the machine must always start at a pre-determined position; the relative large movement during loading and unloading must not take place when the controlled cam motion is in operation for the opening of the dies would entail arcing, destroying the work pieces as well as the die surfaces.

One object of my invention is to develop a machine, incorporating structures capable of avoiding the disadvantages as well as attaining the desirable characteristics enumerated, together and in various combinations as well as in sub-combinations. Among other objects of my invention may be cited the desire to have a combined hydraulic and mechanical control of the metal working machine, an arrangement of control so that the cam operation can be controlled independently of the electrical operation, a control wherein the hydraulic operation may be independent of the electrical and mechanical operations; a control whereby the die operation may be interrupted at any point of the machine operation without affecting or interfering with the controlled cam operation or the other operation of the parts and a control wherein a cam opposes hydraulically initiated motions of the parts.

I have attained the foregoing objects, among others not specifically enumerated, as well as others disclosed in the subjoined specification by providing a metal working machine having accurately controlled relative die movement during working operations and large relative die movement independently of the working operation control during loading and unloading operations.

This invention will be better understood from the following description when considered in connection with the accompanying drawings wherein like ordinals represent corresponding parts in the various figures, and it scope will be pointed out in the appended claims.

In the accompanying drawings.

Referring to the drawings in more detail, I have shown one embodiment of my invention for purposes of illustration and description, comprising a base member 10, preferably a steel casting to carry the weight of the various parts of the super-structure and other portions of the machine as well as to maintain the parts in their proper coordinated relation and to provide a firm foundation. A crown casting 11 providing a major part of the top of the machine is supported on steel columns 12 and 13 of suitable form and contour. The crown member 11 provides a base for the support of the various control mechanisms as well as for a structure carrying and housing the cam, its follower and correlated parts. Each column is provided near its extremities with two vertical slide bearings for cooperation with a slide 14. This arrangement is such that the four vertical slide bearings retain the slide in accurate vertical motion.

The slide 14 carries the upper terminal block and upper die while the base member 10 supports the lower terminal block and its die. The large relative motion of the dies during the loading and unloading operations is obtained by means of a power mechanism interconnecting the crown 11 and the slide 14. The accurate die operation during the welding is controlled by means of a cam 44 and follower mechanism interconnecting the crown and slide 14.

Figure 3:
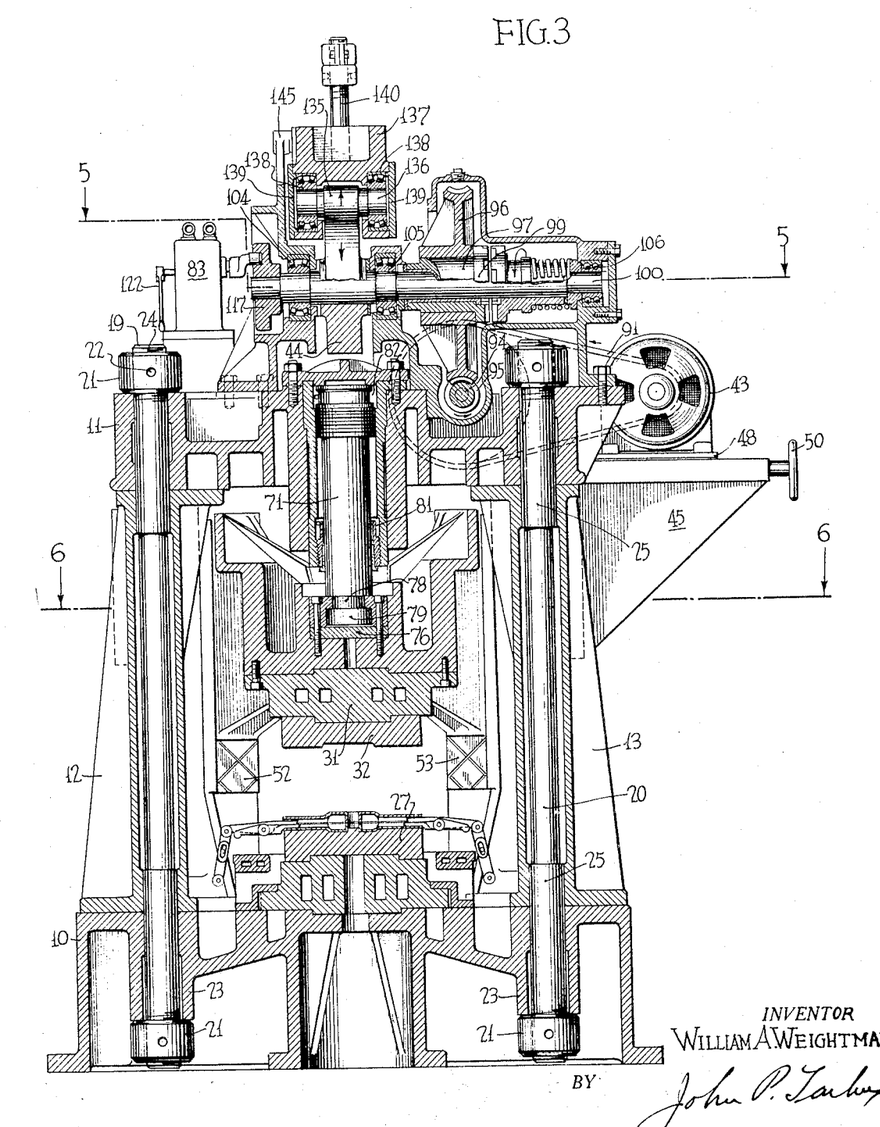
Figure 3 is a front elevation in central section of the machine substantially along the lines 3—3 of Figure 1.
Figures 4, 9:
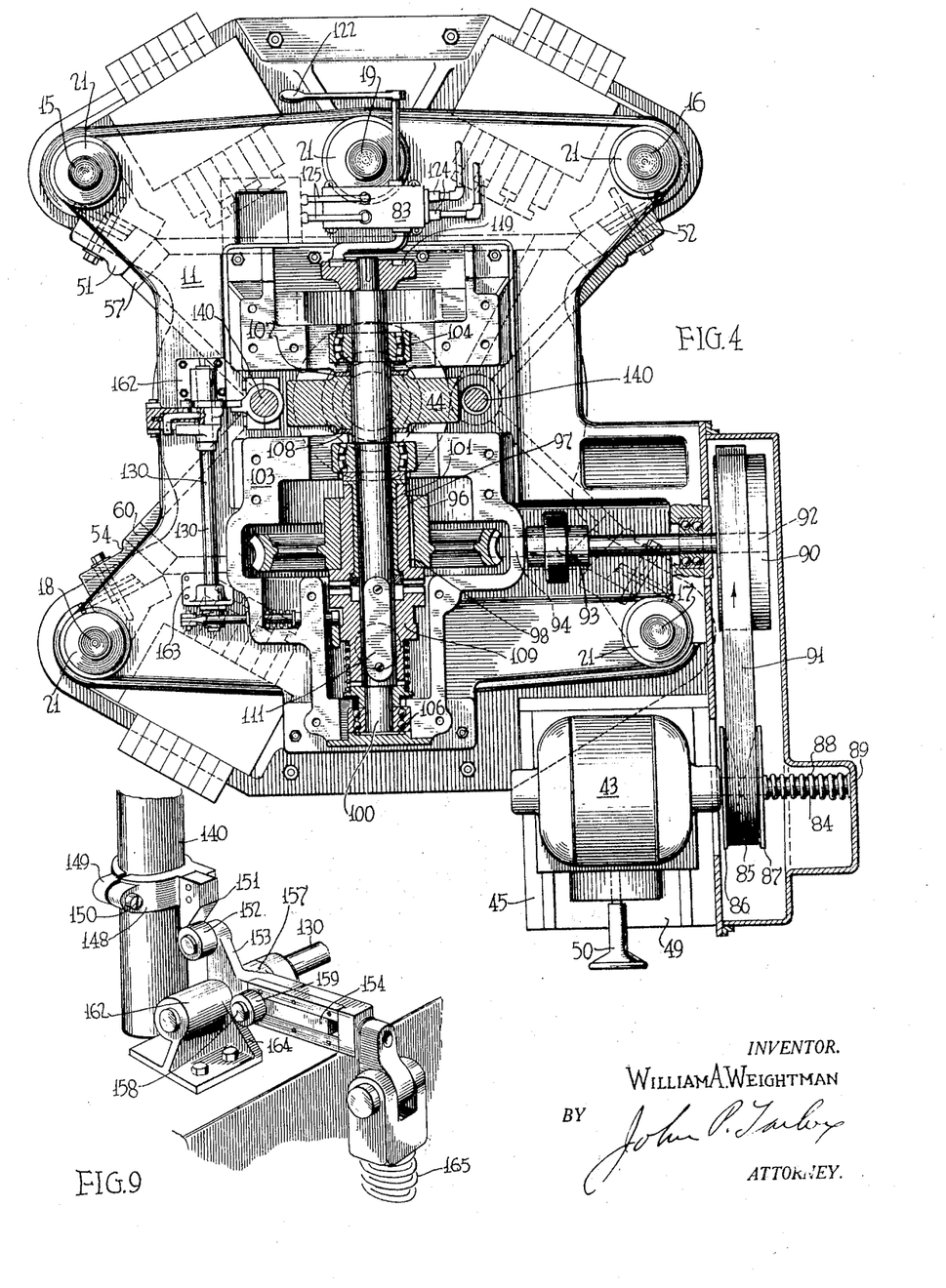
Figure 4 is a plan section view substantially along the lines 4—4 of Figure 2.
Figures 8 and 9 are perspective views showing in greater detail a portion of the control mechanism of the apparatus.

The crown member 11 supported on the base 10 through the intermediation of the columns 12 and 13 provides a strong and easily assembled framework for the machine. By means of six tie rods, four of which, 15, 16, 17, and 18 are of uniform shape and size and two of which, 19 and 20, are of similar shape but greater dimension, the frame is fastened together. These tie rods are preferably steel forgings fastened respectively to the crown 11 and the base 10 by means of a plurality of nuts 21 which may be locked by means of set screws 22. These nuts are seated against bosses 23 in the base and are preferably internally threaded for cooperation with threads 24 on the tie rods. The tie rods are preferably provided with thickened or enlarged areas 25 adjacent their extremities, as may readily be seen in Figure 3. This provides strength and larger bearing areas where this is needed and a reduced section centrally giving the necessary tensile strength for the parts.

Mounted upon the base member is a lower terminal block 26, preferably of cast copper, providing very little resistance to current flow but giving the necessary strength to the parts. Upon the lower terminal block 26 is mounted, in electrical connection therewith, the lower die 27. In close cooperation with the lower die terminal is the finger or spacer bracket ring 28. This member provides the support for a plurality of spacer mechanisms 29 positioned about the die for cooperation with corresponding spoke portions of the spiders 30. Pneumatic or other connections are provided to the spacer bracket ring which in turn provides connections to the spacer mechanisms 29. The cooperating connections between these parts are such as to provide coordination between the action of the spider spacers and the other operations of the machine preferably by pneumatic control.

Figure 7:
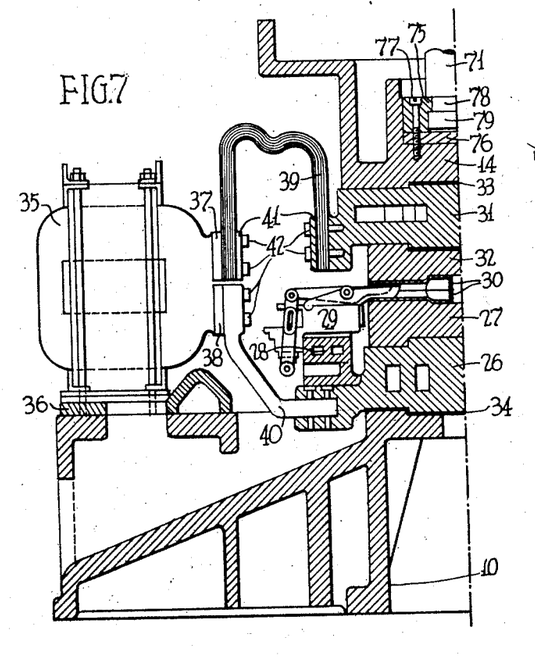
Figure 7 is a partial vertical section of the lower portion of the machine showing the dies and transformer connections, etc.
Figure 8:
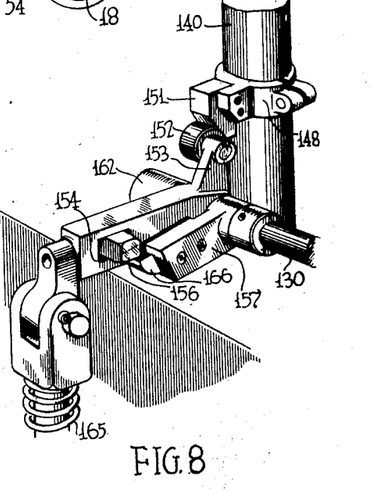

The slide 14 has secured to its lower central face by means of suitable fastenings, the upper terminal block 31 and the upper die 32. The upper terminal block and die are electrically connected. It is readily understood that the dies and terminal blocks may be electrically insulated from the other metal parts of the machine by suitable insulating material, for example, insulating one or more of the parts 33 and 34. These electrical welding connections are more readily apparent in Figure 7, where the aforesaid described parts are clearly shown. A source of welding energy comprising transformer 35 mounted upon an adjustable base or bracket portion 36 is connected from its secondary terminals 37 and 38 to the upper and lower terminal blocks, respectively, by flexible conductors 39 and 40. The terminals and conductors are interconnected and secured by suitable bearing plates 41 and fastening means such as bolts 42. As a result of the cooperation and association of these parts with other electrical control equipment the welding energy can be readily supplied to the dies when the machine parts are moving under the combined hydraulic, cam controlled welding motion.

Figure 5:
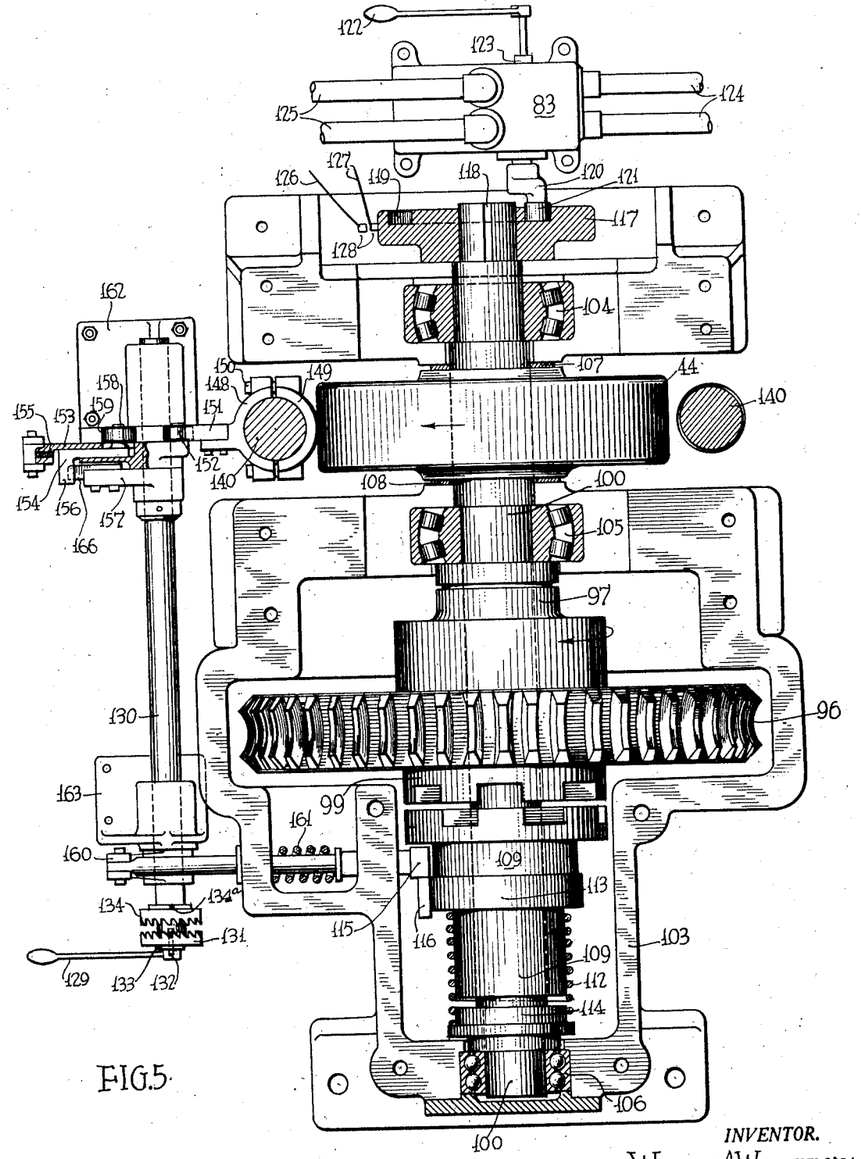
Figure 5 is an enlarged central plan view along the line 5—5 of Figure 3.

The control of the welding is preferably by some means in the primary circuit of the welding transformers, the timing and energizing of this circuit being preferably controlled by electrical connections on a cam surface of the control apparatus as in Fig. 5. This cam is positioned at the end of the shaft 100 carrying the main cam 44 and can be associated with the cam controlling the valve 83. This control is such as to energize the welding circuit at a proper point of the die approach motion and terminate it just prior to the push up.

A source of motive power 43 is used to provide mechanical rotation for the cam 44, the motor 43 being mounted on a bracket 45 which in turn is secured to the column 13 by means of a plurality of bolts and nuts 46 and 47. Adjustment of the motor upon its bracket is by means of a sliding connection providing accurate parallel motion, by a gib portion 48 upon the base of the motor and the key-way 49 upon the upper surface of the motor bracket. A fine adjustment is attainable by means of a hand wheel 50 which in turn operates through a worm and rack adjustment.

Figure 6:
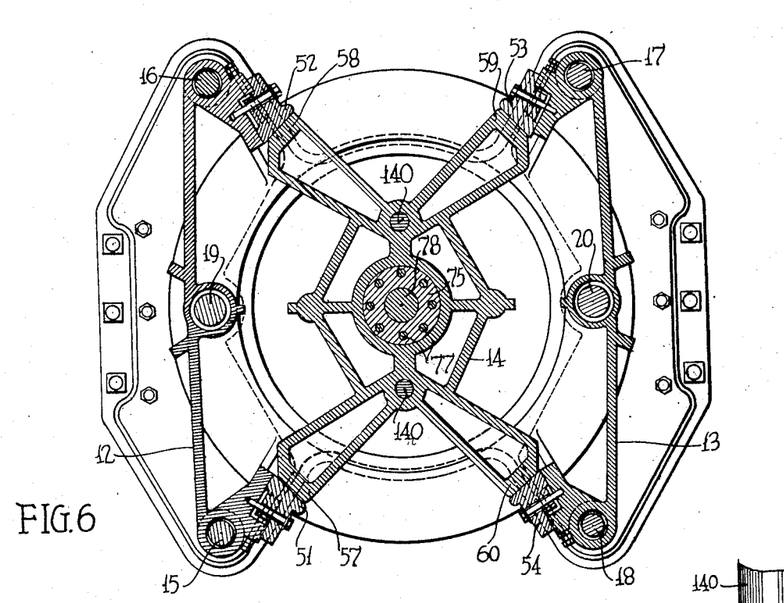
Figure 6 is a plan section view substantially along the lines 6—6 of Figure 3.

For the purpose of providing the accurate positioning of the slide 14 during its vertical motion, slide bearings 51, 52, 53, and 54, of gib form cross section, are located adjacent each extremity of the columns. These slides are accurately machined and provided with necessary oil grooves 55. Each slide gib is provided with a backing bar preferably of steel for purposes of necessary strength, the two parts being secured to the columns as by means of bolts 56. A section of the slide 14, as readily seen in Figure 6, is provided with bearing surfaces 57, 58, 59, and 60 such that the angular positioning of these various slide bearings result in an overall wedge shaped bearing for the slide, in each direction to which motion might tend to move it out of center.

The crown member 11 is provided centrally with an opening 61, the upper portion of which is of slightly larger diameter having an annular shoulder 62. Within the opening is mounted a removable cylinder wall 63 having a corresponding shoulder portion for seating upon the shoulder 62 of the crown block. The cylinder is closed at its upper end by a cylinder head 64 which in turn is secured to the crown block by a plurality of bolts 65, or if double threaded studs and nuts are desired they may be used. Any necessary gaskets may be utilized for securing a fluid tight joint, the preferable position for such gaskets being in the annular groove of the cylinder head within which the cylinder wall interfits. The lower end of this cylinder is partly closed by means of a stuffing box 66, secured to the cylinder wall by means of the complemental thread 67 on the cylinder wall and stuffing box. To provide a smooth surface for the piston rod 71, the bushing 68 is secured within the stuffing box. The lower end of the stuffing box is closed by means of a gland 69 and interposed between the gland and bushing is a suitable packing 70.

Between the crown 11 and the slide 14 is interposed a suitable connection, through the intermediation of the piston rod 71 and its associated parts providing a double acting arrangement. The lower end of the piston rod has an annular groove 78 providing an enlarged head portion 79 and is secured centrally to the slide thereby by means of a clamp ring 75, in two halves, and secured by bolts 77. Interposed between the clamp ring and the slide is preferably a pressure plate 76. The opposite end of the piston rod has a reduced section, substantially cylindrical portion 80 screw threaded near its extremity, the piston 72 being secured to this portion by a nut 74. The necessary packing for the piston is provided by means of the piston rings 73. Cylinder 63 has suitable portions providing inlet and exhaust openings for fluid agents or other mediums which are used for operating the same and the upper portions of the stuffing box 66 and the piston 72, respectively, are of reduced diameter providing spaces 81 and 82 within the cylinder to allow free ingress and egress of the fluids when the piston is at its opposite end stroke positions. From this it is readily seen that the entrance of a fluid medium in the upper portion of the cylinder causes the piston to move downwardly and because of the operating connections between the piston rod and the slide, the slide 14 likewise moves downwardly carrying with it the upper terminal block and dies. When the motivating medium is allowed to exhaust from the upper part of the cylinder and motive power is provided in the lower part of the cylinder the piston 72 is caused to rise, similarly carrying with it the slide and its die part. This relative movement allows a very large motion between the upper die 32 and the lower die 27 independently of the cam 44. This movement may be accurately controlled by providing a differential action between the fluid medium at one side of the piston and that at the other. The control of the hydraulic cylinder is coordinated or synchronized with the movement of the dies by means of a four-way hydraulic valve 83 mounted upon the crown block 11. This valve has automatic synchronized control with the motion of the cam 44.

The mechanical movement of motor 43 is transferred to the cam 44 by the following described mechanical movements, but it is obvious that other arrangements may be utilized for the transfer and transformation of energy. The electric motor 43 driven by means of electrical energy from power lines, received through electrical switches has upon its shaft 84 a double cone pulley 85 comprising opposite angular cone discs 86 and 87 secured on the shaft 84 by splines allowing for relative movement between the discs, and positive drive between the pulley and motor. A spring 88 retained on the shaft by a collar or the end of the housing 89 yieldably urges the two discs together. A belt 91 of substantially trapezoidal section transfers the motion of pulley 85 to the pulley 90. A variable gear ratio is obtainable through this connection by means of the adjustment of the cone pulley such that its effective radius may be changed, thus changing the effective ratio of the pulley 90 and the pulley 85. These adjustments may require a similar new position for the motor 43 which can be obtained by the adjustment through the hand wheel 50. The pulley 90 is secured to the extension shaft 92 in a suitable manner and the shaft is secured to the shaft 94 by means of a coupling 93. At the opposite end of the shaft 94 is mounted the worm 95 which in turn causes the motion of the main driving gear or worm wheel 96. The hub of the worm wheel 96 is mounted upon a cylindrical portion 97 of a jaw clutch 99 and is secured thereto by means of a key 98. The jaw clutch 99 rides freely upon the main cam shaft 100 through the sleeve bearing 101. A high degree of adjustability and flexibility through this gear train is available by the use of a constant or variable speed motor 43, a variable ratio of the pulleys 85 and 90, as well as the variable factor of the many possible gear ratios between the worm 95 and worm wheel 96. As long as the motor 43 is in operation the continuous drive of the worm wheel 96 is obtained, likewise providing a continuous drive of the one jaw clutch member 99. However, no motion is imparted to the main cam shaft 100 through the arrangement as thus far described.

Figure 2:
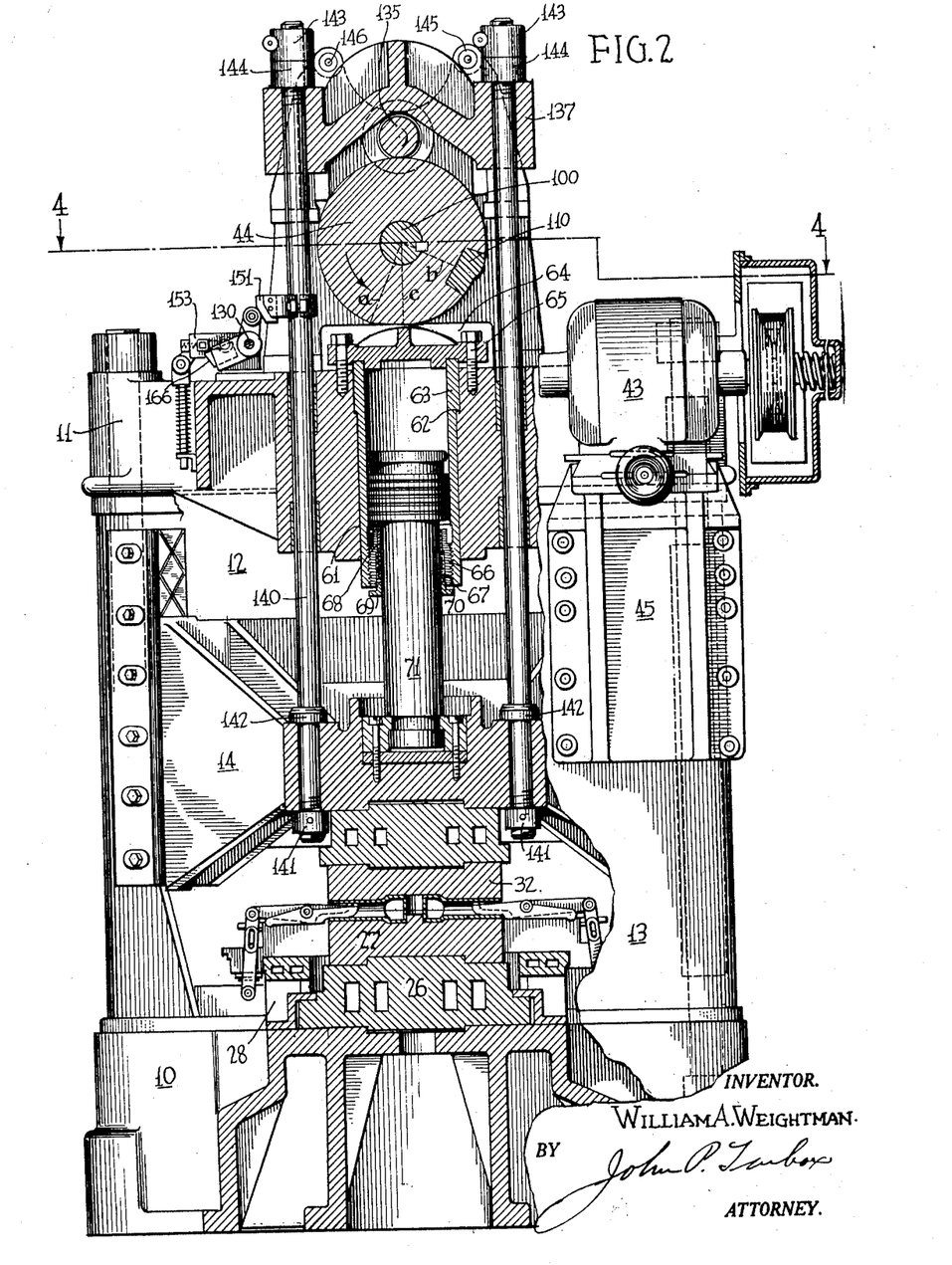
Figure 2 is a view similar to Fig. 1 showing the parts during a welding operation.

The operating cam 44 is preferably made of tool steel to preserve its machined surface and is keyed to the shaft 100 by a key 102, the shaft being supported upon the crown 11 by means of the gear housing 103 and carried therein by the three main bearings 104, 105, and 106. This cam has a peripheral surface, extending clockwise (as seen in Fig. 2) between the radial lines thereof $a$, $b$, governing the burning or flashing operation of the welding. In the immediate vicinity of the line $b$ occurs the push-up portion, during which time the welding current is stopped and the parts are pushed together by great pressure to create the welds and between the radial lines $b$, $c$, the die parts are substantially idle as far as relative motion is concerned, allowing for a cooling of the weld before the machine pressure is removed. The surface contour between the lines $c$ and $a$, re-positioning the parts for a new operation, the cycle of the control cam being preferably once for each welding operation, the parts automatically re-setting at the termination thereof. At the portion of the cam where push-up occurs a metal insert 110 is provided so that this particular portion of the cam receiving most of the wear can be readily replaced without very extensive replacement operations.

Interposed between the two bearings 104 and 105, and the operating cam are thrust washers 107 and 108. To the right of the worm wheel 96 on shaft 100 is found the shifting or moving element of the jaw clutch comprising the member 109 which is movably axially of the shaft but limited as to rotary movement by a feather key 111. It is urged to effect the engagement of the two component parts of the clutch, i. e., 99 and 109 through the spring 112 which engages the flange portion 113 at one end and against the thrust collar 114 at the other. Although the two members of the jaw clutch are continuously biased toward engagement, they are retained in dis-engaged position by the latch 115 normally engaging the cam 116 secured to the flange 113 of the slidable clutch element. The cam 116 is so arranged that when the two members of the jaw clutch are engaged and are moving counter-clockwise, as viewed in Fig. 5, driving the main cam 44 and operating the machine, the cam surface 116, at the end of one revolution, if the latch 115 is returned to the position shown, will be forced out of engagement by the cam surface and stop the machine operation. Every time that the latch 115 is withdrawn and allowed to return, one controlled revolution of the main cam will occur. The latch being moved radially with respect to the shaft 100 allows the jaw clutch member 109 to move axially with respect thereto under the urge of the spring 112, and engage the jaw portion on the member 99, thus transmitting the movement from the motor through the various gear trains and other connections to the cam 44. For additional flexibility of operation the opposite end of the shaft 100 carries a cam 117 keyed through the key-way 118 and having in its outer surface a groove or slot 119 which is accurately machined to coordinate the hydraulic control of the machine with respect to the main cam 44 and the other operations, after the hydraulic motion is initiated. This slot transfers to the valve 83 definite control through a crank arm 120. One end of the crank arm has a follower 121 running in the slot, and the other end is connected to the valve stem. The valve stem continues through the valve housing and has at its far side a mechanical clutch connection 123 interposed between it and the lever 122. By this means the hydraulic fluid control devices 63 and 71 can be operated independently of the cam by engaging the clutch 123 and controlling the valve by hand. Pipe connections 124 and 125 provide inlet and exhaust connections to the double acting cylinder 63 to normally control the approach and retrograde die movement synchronously with machine operation. It thus may effect control of the movement independently of the other machine functions. The welding energy control likewise is preferably coordinated with this cam 117 by contacts 128 arranged with electrical connections 126 and 127. One contact is secured to the cam and the other one relatively fixed in space. These contacts are so positioned that the flashing will begin substantially in the vicinity of the line $a$ of Fig. 2 and stop substantially at the line $b$ at which time the push-up occurs. By this arrangement and by means of the lever 122, the hydraulic operation of the press may be tested independently of electrical control and/or independently of the main cam.

To allow the mechanical cycle of operation of the machine to take place independently of the electrical, hydraulic and/or other controls, the hand lever 129 is arranged with respect to the shaft 130, for either normal idling or controlled engagement. The lever 129 has a jaw clutch portion 131 riding upon a feather key 132 on the end of the shaft and normally held in dis-engaged position by the ball and spring latch 133, the other member of the jaw clutch 134 being fast to the shaft 130 by a set screw 134a. When controlled mechanical operation of the machine, independently of other operations is desired, the lever 129 is moved, releasing the latch 133 and the jaws 131 and 134 become engaged, allowing the rotary movement of the shaft 130 to effect the dis-engagement of the latch 115 and allow the motor to drive the main cam 44. As later explained, this operation due to latches and other mechanisms, can be entirely independent of the other control. The remaining control of this latch automatically with the machine operation will be hereinafter described.

The apparatus as described, allows the large motion between the dies 27 and 32 through the intermediation of the double acting cylinder 63. The accurate, controlled, welding or working motion is attained by the transfer of the cam motion 44 to the die 32, through the cam follower 135 and its associated parts in opposition to the hydraulic motion. The cam follower may be an integral member with the shaft portion 136 which is housed in secured relation to the yoke 137 by the bearings 138 which are concealed in the yoke housing by the bearing covers 139. The vertical movement of the cam follower 135 as a result of the changing radius of the cam 44 is transferred to the slide 14 and the die 32 by means of two tie rods 140, threaded at their ends. The connections to the slide are by means of collars 141 and 142 and the connections to the yoke by means of collars 143 and 144. The cylinder 63 provides downward movement and downward application of forces upon the upper die 32. The came 44 and its follower 135 provide a vertical movement opposite to the movement from the cylinder. As a result of these two opposed motions accurate die movement during the welding operation per se is attained. This mechanical upward motion and hydraulic downward motion provide differential mechanical fluid control of great utility. To complete the upper structure of the machine, bearing members 145 are provided and connected together by suitable yoke rods 146. The rods 140 pass through suitable bearings 147 in the crown block, maintaining the alignment of the parts as well as rigidity in the structure.

Figure 1:
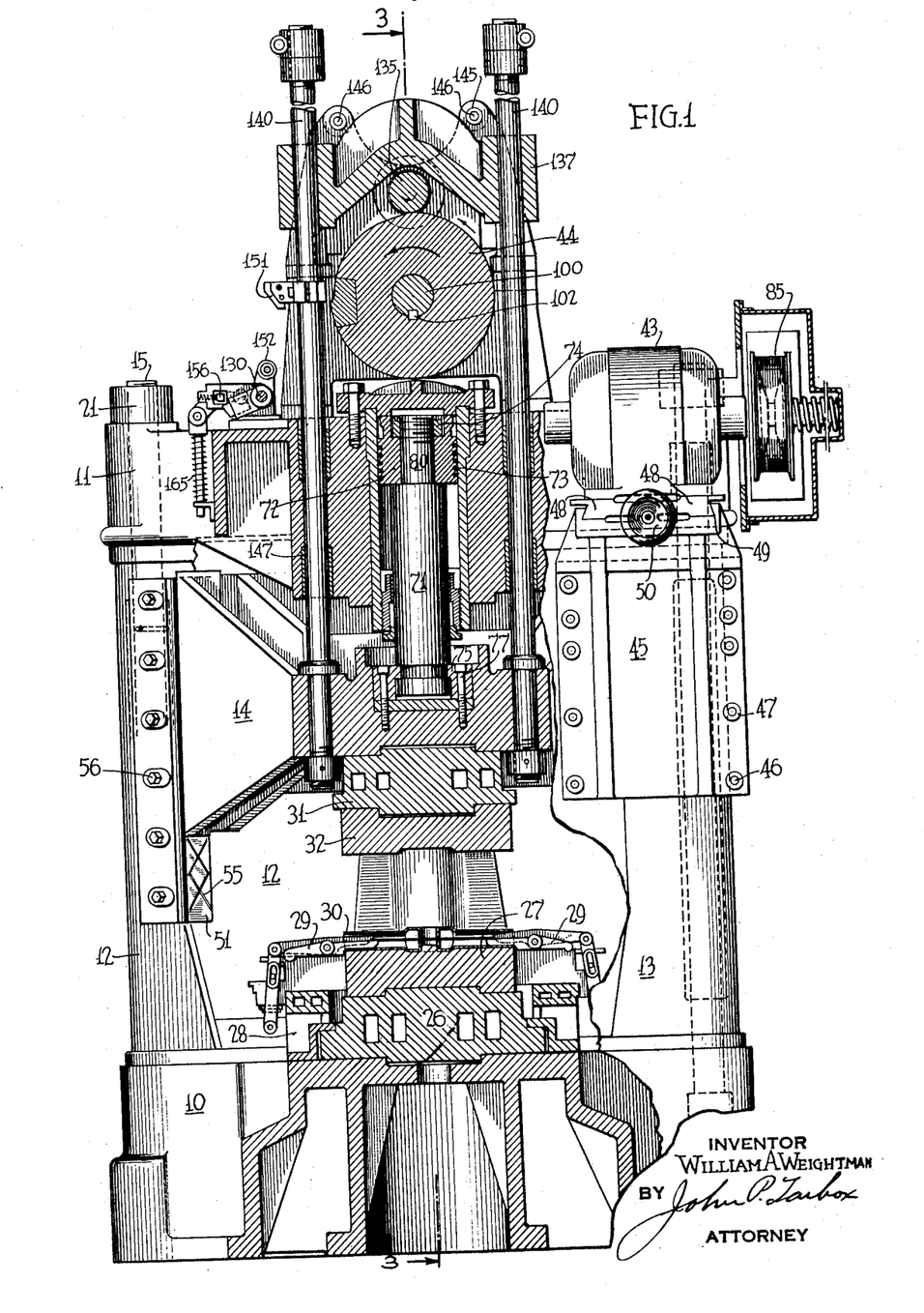
Figure 1 is a vertical elevation of a machine incorporating features of my invention shown partly in section and having parts broken away for purposes of clearness.

To initiate and/or to determine the operation of cam 44 automatically, the clutch parts 99 and 109 are actuated in coordination with the movement of the rods 140 and associated parts. Upon one of these rods is secured a split collar, comprising parts 148 and 149, which are fastened together by bolts 150 and to which is fastened a cam element 151. As the rod and its associated parts move up and down, the cam 151 likewise moves up and down, in its raised position being shown in Fig. 1, and in an operative position shown in Fig. 2, in which operative position it effects the engagement of the clutch 99—109 through the intermediation of shaft 130 and latch 115. Hand control of the operation may, of course, be by lever 129.

Cam 151 moves downwardly, and in so doing, engages the roller 152 carried upon one arm of a bell crank 153, which bell crank is free upon the shaft 130. The engagement of the cam surface and the roller effects the counter-clockwise movement of the bell crank 153 about the shaft 130 against the spring 165. Carried in the opposite arm of the bell crank 153 is a latch block 154 biased towards the shaft 130 by a spring 155. The latch block has an extension 156 which engages the latch lever 157 which lever is secured to the shaft 130. Extending from the other side of the latch block is an arm 158 upon which is a roller 159. In consequence of counter-clockwise movement of the bell crank 153 the latch lever 157 is likewise moved counter-clockwise, turning the shaft 130 in a similar direction. This counter-clockwise motion likewise effects the counter-clockwise movement of the clutch operating crank 160 which effects the dis-engagement of the latch 115, moving it against the spring 161.

The shaft 130 is secured upon the crown block 11 by two bearing brackets 162 and 163, each of these brackets having bearing portions and base portions. However, the bracket 162 is also provided with a cam surface portion 164 which engages the roller 159 in its counter-clockwise movement about shaft 130, causes a radial movement of the latch block 154 which in turn effects a disengagement of the part 156 and the latch lever 157. As a result of this dis-engagement the spring 161 returns the latch 115 against the portion 109 of the clutch member and re-sets the shaft 130 into its initial position. In this manner, as soon as the rotation of the jaw clutch 109 progresses sufficiently far, a disengagement of the drive is accomplished. This also effects a change in the valve 83 and causes the piston rod 71 to move vertically, carrying the dies and a consequent vertical motion of the cam 151. The movement of the cam 151 vertically, allows the spring 165 to return the bell crank 153 into its pre-set position, and allows the latch block extension 156 to slip by the latch lever due to the cam surface 166 thereon and the mechanism is entirely re-set for the next operation.

As a result of the detailed description and operation of the various parts it is seen that the valve 83 controls the operation of the double acting cylinder 63 which in turn controls the motion of the upper die and the relative motion of the dies. This valve control may be either by hand from the lever 122 or automatically from the cam 117 and initially may be by hand at starting. The electrical energization of the transformers 35 is accomplished as a direct result of the switches 128 from the main cam shaft but may also be controlled by other manual switches. The motion of the cam 44 is initiated through the engagement of the cam 151 with the latch mechanism on shaft 130 and as a result the downward movement of the dies is accurately controlled by the opposed motion of the main cam 44. By means of the lever 129 the cam motion can be controlled independently of the other operations of the machine. By means of the lever 122, if a stall should occur in the work pieces the die motion may be immediately reversed, by a reversal of the double acting cylinder 63 without at all interfering with the continued mechanical movement of the cam 44 and its associated parts, but effectively stopping the transmission of cam motion to the die.

The sequence of operation of the apparatus is substantially as follows. When all the parts are in their normal position and the dies are apart, the ram being up, one stamping 30 is placed upon the lower die member 27, the pneumatic operators are actuated, placing the fingers 29 upon this lower stamping in operative position, creating equal pneumatic pressure application upon all of the fingers, at which time the upper stamping 30 is placed thereupon. The four-way hydraulic valve 83 is operated by hand initiating the downward movement of the ram, which continues downwardly. Just before the engagement with the upper stamping, the cams 151 and 152 operate, releasing the jaw clutches and beginning the operation of cam 44. The downward die movement is interrupted by the opposite motion of the cam giving a resultant controlled motion corresponding to the desired flashing or burn off. Approximately three-fourths of the cam surface controls the burn off or flashing of the parts, and the push-up occurs after which a period of cooling takes place before any further die movement occurs. After this cooling period the cam motion withdraws the dies pre-setting the same and dis-engaging the clutch, effectively re-setting the entire system by the reversal of the valve 83, which in turn effects the return stroke of the cylinder. The hydraulic mechanical control is thus completed and a new operation in order.

The specific form of apparatus shown is for the purpose of illustration and not by way of limitation, and variations are intended to be covered by the hereto appended claims.

What I claim is:

1. A metal working machine comprising relatively movable die members, double acting hydraulic means for moving said dies together and apart, a master cam means opposing the approach motion of said dies during the working portion per se of said approach motion, power means arranged to effect the operation of said cam means, means synchronized with said cam means to control said first-named means, means synchronized with said cam means to effect the application of welding energy to said die, and means synchronized with said hydraulic means to control the application of power to said cam means, and means arranged to pre-determine the period of application of said power to said cam means, and hand operated means effective to control the application of power to said cam means independently of said synchronized control operation thereof.

2. A metal working machine comprising relatively movable die members, double acting hydraulic means for moving said dies together and apart, a master cam means opposing the approach motion of said dies during the working portion per se of the approach motion, power means arranged to effect the operation of said cam means, means synchronized with said cam means to control said first-named means, means synchronized with said cam means to effect the application of welding energy to said die, and means synchronized with said hydraulic means to control the application of power to said cam means, and means arranged to pre-determine the period of application of said power to said cam means, and hand operated means arranged to effect the control of said double acting hydraulic means independently of the synchronized control operation thereof.

3. A metal working machine comprising relatively movable die members, double acting hydraulic means for moving said dies together and apart, a master cam means opposing the relative approach motion of said dies during the working portion motion per se thereof, power means arranged to effect the operation of said cam means, means synchronized with said cam means to control said first-named means, means synchronized with said cam means to effect the application of welding energy to said dies, means synchronized with said hydraulic means to control the application of power to said cam means, means arranged to pre-determine the period of application of said power to said cam means, and hand operated means arranged to effect the control of said double acting hydraulic means independently of the synchronized control operation thereof and arranged to effect relative separation of said dies at any portion of the approach motion thereof while rendering ineffective the cam control of said dies.

4. In a metal working machine the combination of relatively movable dies and means arranged to effect the relative approach and recession of said dies required for the working operation per se, a cam controlling said movement having a peripheral contour designed to afford such movement only, means independent of said periphery arranged to afford a relative die movement from and toward each other relatively much greater than the said movement of the working operation per se, and means transferring said cam movement and said first-named means movement to said dies and arranged to effect a resultant relative die approach movement the differential of said two movements.

5. In a metal working machine, dies having a degree of approach toward and recession from each other measured by those movements required for proper functioning of the dies in carrying out a working operation per se, a cam controlling said relative die movement and having a peripheral contour designed to afford such movement only, and means independent of the periphery of said cam to afford a relative die movement between the dies relatively much greater than the degree of movement required to carry out the working operation, per se.

6. In a metal working machine the combination of relatively movable dies, hydraulic means arranged to provide large relative die movement, cam means arranged to control the working relative movement per se of said dies, means interconnecting said cam and hydraulic means, said last named means arranged so that said hydraulic means can control the retrograde relative die movement independently of said cam means and so that the final approach motion of said dies is controlled by said cam means.

7. In a metal working machine the combination of relatively movable dies, means arranged to provide large relative die movement, means comprising a cam arranged to control the working relative movement per se of said dies, lost motion means interconnecting said means, said last named means arranged so that said first-named means can control the retrograde relative die movement independently of said second-named means and so that the final approach motion of said dies is controlled by said second-named means.

8. In a metal working machine the combination of relatively movable dies, means arranged to force said dies together and to move said dies apart, means comprising a rotatable cam arranged to control the approach motion of said dies during the working operation per se and opposing the motion of said first-named means during said working motion per se, said first-named means arranged to effect the relative movement apart of said dies independently of said last-named means.

9. A metal working machine comprising relatively movable die members, double acting hydraulic means for moving said dies together and apart, a master cam means opposing the approach motion of said dies during the working portion per se of the approach motion, power means arranged to effect the operation of said cam, means synchronized with said cam to control said first-named means, means synchronized with said cam to effect the application of welding energy to said die, and means synchronized with said hydraulic means to control the application of power to said cam means, and means arranged to predetermine the period of application of said power to said cam means.

10. In a metal working machine the combination of relatively movable dies, a cam for imparting pre-determinate movement to said dies, means including a follower arranged to transfer the cam motion to the dies, and means independent of said cam and follower arranged to impart relative movement to said dies relatively much greater than the degree of movement required to carry out the working operation per se.

11. In a metal working machine, the combination of relatively movable dies, a cam for imparting pre-determinate movement to said dies, follower means arranged to transfer the cam motion to a die, and means arranged to relatively retract said dies independently of the cam and follower means and arranged to make inactive the connection between the follower and the die.

12. In a metal working machine, relatively movable working parts, a master cam, power means for driving said cam, a clutch interposed between said cam and power means, a control means effecting the engagement of said clutch after a predetermined amount of the relative approach movement of said parts and latch means arranged to disrupt the train of control of said last-named means after its actuation.

13. In a metal working machine the combination of relatively movable working parts, fluid operated means arranged to force said parts together, and cam means arranged to oppose the relative approach motion of said parts and to allow a resultant relative approach motion of said parts corresponding to the control motion of said cam surface.

14. In a metal working machine having relatively movable die members, a power driven cam means controlling the approach motion thereof, a clutch between said cam and its power means, means holding said clutch in disengaged position, and means effecting the engagement of said clutch in synchronism with the approach motion of said dies, said last-named means being arranged to pre-determine the period of engagement of said clutch after the initial engagement thereof and to terminate the control by said die approach movement.

15. In a flash welding machine the combination of relatively movable dies, hydraulic means arranged to force said dies together, mechanical means comprising a cam arranged to oppose the approach die motion from said hydraulic means and to allow a resultant approach motion corresponding to the control motion of said cam surface.

WILLIAM A. WEIGHTMAN.